(12) United States Patent
Lu

(10) Patent No.: US 7,789,518 B2
(45) Date of Patent: Sep. 7, 2010

(54) IMAGING SYSTEM AND PROJECTION APPARATUS HAVING LIGHT BEAM MODULATION MODULE

(75) Inventor: Chun-Yu Lu, Hsinchu (TW)

(73) Assignee: Coretronic Corporation, Hsinchu (TW)

( * ) Notice: Subject to any disclaimer, the term of this patent is extended or adjusted under 35 U.S.C. 154(b) by 659 days.

(21) Appl. No.: 11/747,918

(22) Filed: May 14, 2007

(65) Prior Publication Data

US 2008/0018864 A1 Jan. 24, 2008

(30) Foreign Application Priority Data

Jul. 20, 2006 (TW) .................. 95126498

(51) Int. Cl.
G03B 21/14 (2006.01)
(52) U.S. Cl. ..................... 353/97; 353/88
(58) Field of Classification Search ............ 353/88, 353/97
See application file for complete search history.

(56) References Cited

U.S. PATENT DOCUMENTS

| | | | |
|---|---|---|---|
| 5,829,858 A | 11/1998 | Levis et al. | |
| 5,884,991 A | 3/1999 | Levis et al. | |
| 6,637,894 B2 | 10/2003 | Dewald et al. | |
| 6,854,851 B2 | 2/2005 | Yamasaki et al. | |
| 6,886,944 B2 | 5/2005 | Dahlgren | |
| 7,287,864 B2* | 10/2007 | Shirasu et al. | 353/97 |
| 2005/0001997 A1* | 1/2005 | Kawaai et al. | 353/97 |
| 2005/0147364 A1 | 7/2005 | Ikeda et al. | |

FOREIGN PATENT DOCUMENTS

| | | |
|---|---|---|
| JP | 2003-156711 | 5/2003 |
| TW | 456722 | 9/2001 |
| TW | I234049 | 6/2005 |

* cited by examiner

*Primary Examiner*—Thanh X Luu
(74) *Attorney, Agent, or Firm*—Jianq Chyun IP Office

(57) ABSTRACT

An imaging system suitable for projecting an image beam provided by a light valve unto a screen is provided. The imaging system includes a projection lens and a light beam modulation module. The projection lens is disposed on an optical path of the image beam, so as to project the image beam unto the screen. The light beam modulation module comprising a fixed light shutter and a movable light shutter is disposed between the projection lens and the light valve. The fixed light shutter is disposed on the optical path of the image beam so as to shield off a portion of the circumferential light of the image beam. The movable light shutter is suitable for moving into the optical path of the image beam to shield off another portion of the circumferential light of the image beam.

17 Claims, 5 Drawing Sheets

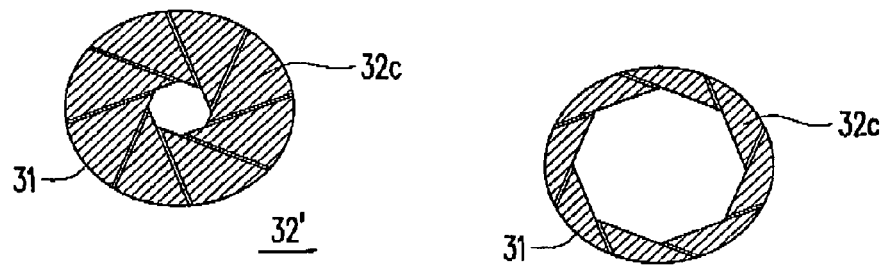
FIG. 1C(PRIOR ART)
FIG. 1C'(PRIOR ART)
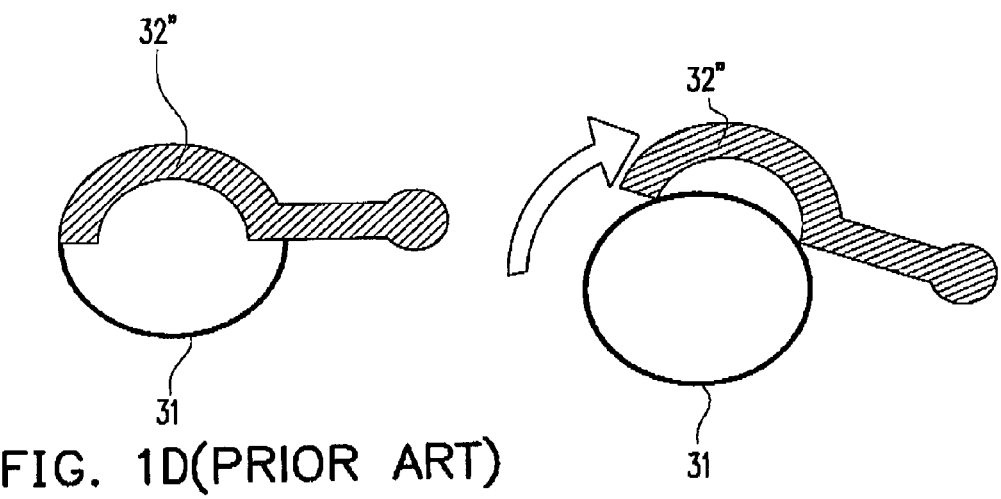
FIG. 1D(PRIOR ART)
FIG. 1D'(PRIOR ART)

IMAGING SYSTEM AND PROJECTION APPARATUS HAVING LIGHT BEAM MODULATION MODULE

BACKGROUND OF THE INVENTION

1. Field of Invention

The present invention relates to an imaging system and a projection apparatus. More particularly, the present invention relates to an imaging system and a projection apparatus with lower cost and better imaging quality.

2. Description of Related Art

Please refer to FIG. 1A and FIG. 1B. The conventional projector 40 comprises an illumination system 10, a light valve 20 and an imaging system 30. The illumination system 10 emits an illumination beam 10a. The light valve 20 is disposed on the optical path of the illumination beam 10a to convert the illumination beam 10a into an image beam 20a. The imaging system 30 is disposed on the optical path of the image beam 20a to project the image beam 20a unto a screen (not shown), and the imaging system 30 includes a projection lens 31 and a fixed light shutter 32. The fixed light shutter 32 is disposed in die projection lens 31. The low-intensity light in the aperture of the projection lens 31 is shielded by the fixed light shutter 32, so as to enhance the contrast.

However, because the fixed light shatter 32 is located inside of the projection lens 31, the structure of the projection lens 31 is relatively complex and the manufacturing cost is higher. Besides, the effect of enhancing the contrast is not as good as expected because the light shutter 32 can only shield off the circumferential dispersed light of the lower portion of the image beam 20a.

To solve the undesired effect of contrast enhancement of the light shutter 32, another design of the conventional light shutter is respectively illustrated in FIGS. 1C and 1C', and FIGS. 1D and 1D'. In FIGS. 1C and 1C', the light shutter 32' is formed by a plurality of leaves 32c. The contrast can be improved by opening and closing of the leaves 32c to shield off partial light beams, as illustrated in FIGS. 1C and 1C' respectively. However, the structure of the light shutter 32' comprising a plurality of leaves 32c is complicated, which increases the manufacturing cost. As shown in FIGS. 1D and 1D' respectively, a movable light shutter 32" is used for adjusting the contrast. The light shutter 32" is formed by a half-annular shielding plate, therefore, only the circumferential dispersed light located at the upper portion of an image beam 20a can be shielded. Consequently, the effect of contrast enhancement is still insignificant. In addition, the casing of a projection lens 31 requires an opening to make a light shutter 32" move into or away from the projection lens 31, the entire structure of the projection lens 31 is not stable. As a result, when the movable light shutter 32" is moved into or away from the projection lens 31, the lens of the projection lens 31 (not shown) is likely to vibrate, thereby affecting the imaging quality.

SUMMARY OF THE INVENTION

One objective of the present invention is to provide an imaging system with lower manufacturing cost and higher imaging quality.

Another objective of the present invention is to provide a projection apparatus with lower manufacturing cost aid better imaging quality.

In order to achieve the objectives mentioned above or others, the present invention provides an imaging system, which is suitable for projecting an image beam provided by a light valve unto a screen. The imaging system includes a projection lens and a light beam modulation module. The projection lens is disposed on an optical path of the image beam, so as to project the image beam unto the screen. The light beam modulation module comprising a fixed light shutter and a movable light shutter is disposed between the projection lens and the light valve. The fixed light shutter is disposed on the optical path of the image beam so as to shield off a portion of the circumferential light of the image beam. The movable light shutter is suitable for moving into the optical path of the image beam so as to shield off another portion of the circumferential light of the image beam.

The present invention further provides a projection apparatus, which includes an illumination system, a light valve and the abovementioned imaging system. The illumination system is suitable for providing an illumination beam. The light valve is disposed on an optical path of the illumination beam, so as to convert the illumination beam into an image beam. The projection lets is disposed on an optical path of the image beam, so as to project the image beam unto the screen.

The projection apparatus provided by the present invention significantly enhances the image contrast by adopting a fixed light shutter and a movable light shutter to effectively shield off the dispersed lights. Furthermore, the light beam modulation module is disposed between the projection lens and the light valve so that the structure of the projection lens is simplified. In other words, the imaging system and the projection apparatus provided by the present invention have better quality and lower manufacturing cost.

Other objectives, features and advantages of the present invention will be further understood from the further technology features disclosed by the embodiments of the present invention wherein there are shown and described preferred embodiments of this invention, simply by way of illustration of modes best suited to carry out the invention.

BRIEF DESCRIPTION OF THE DRAWINGS

FIG. 1C and FIG. 1C' are schematic views respectively illustrating the opening and closing of a conventional light shutter of another design.

FIG. 1D and FIG. 1D' are schematic views respectively illustrating a conventional movable light shutter of yet another design moving into and away from the projection lens.

DESCRIPTION OF EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1A:
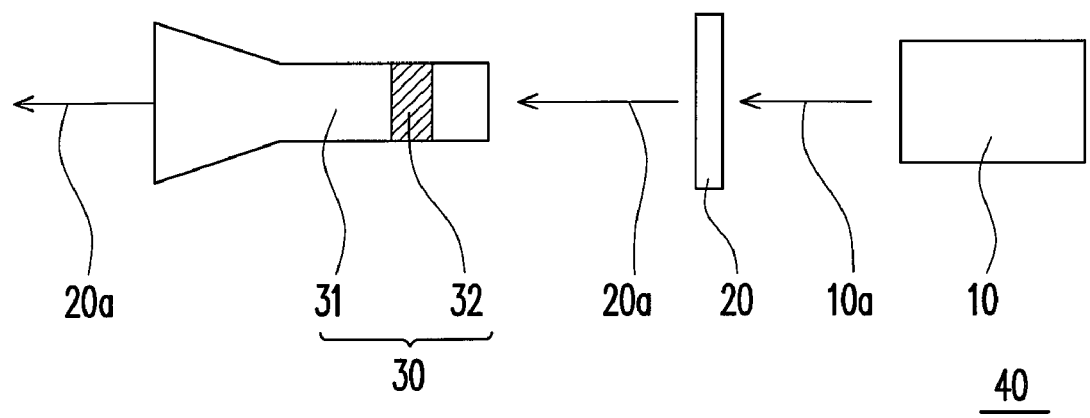
FIG. 1A is a schematic view of the conventional projector.
Figure 1B:
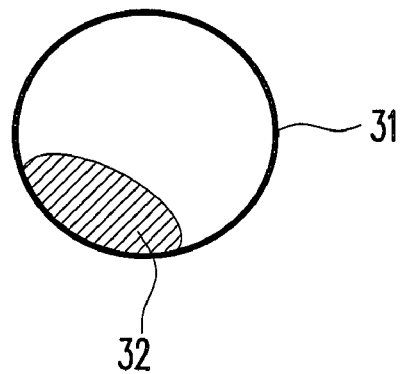
FIG. 1B is a schematic view of alight shutter of the projector in FIG. 1A.
Figure 2A:
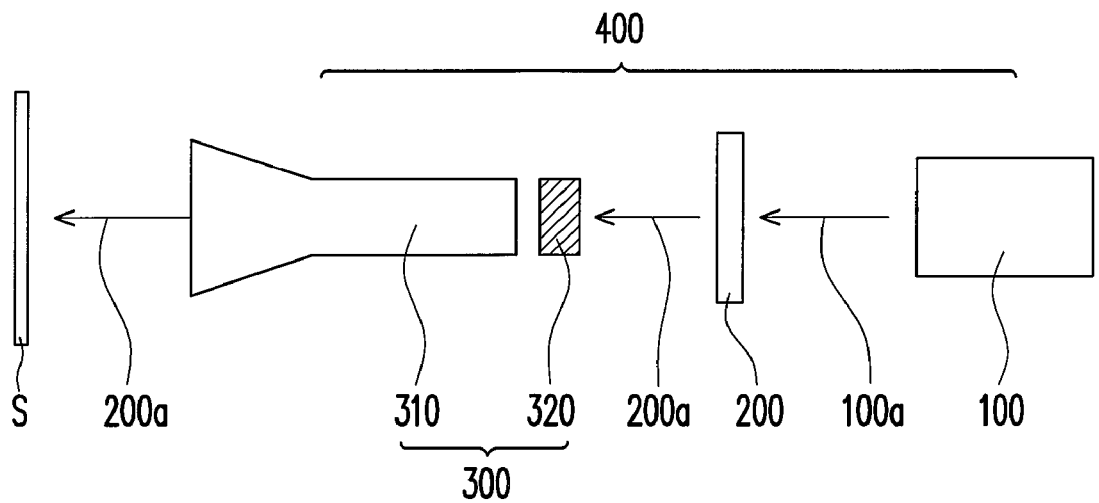
FIG. 2A is a diagram showing the structure of a projection apparatus according to one embodiment of the present invention.
Figure 2B:
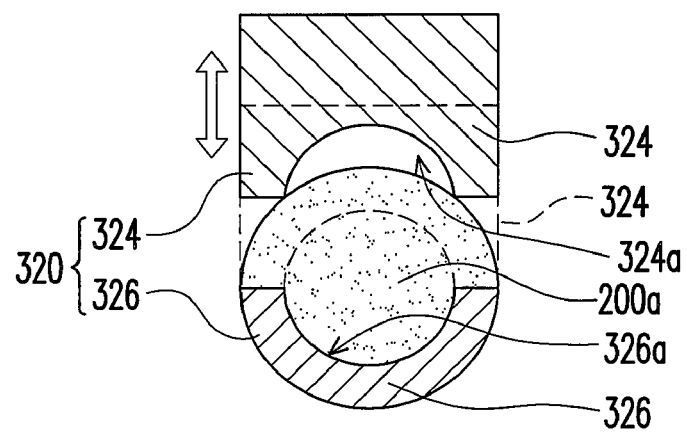
FIG. 2B is a schematic view of a light beam modulation module of the projection apparatus in FIG. 2A.

Referring to FIG. 2A and FIG. 2B, a projection apparatus 400 includes an illumination system 100, a light valve 200 and an imaging system 300. The illumination system 100 provides an illumination beam 100a. The light valve 200 is disposed on an optical path of the illumination beam 100a, so as to convert the illumination beam 100a into an image beam 200a. The projection lens 300 is disposed on an optical path of the image beam 200a, so as to project the image beam 200a unto a screen S. The imaging system 300 includes a projection lens 310 and a light beam modulation module 320. The projection lens 310 is disposed on the optical path of the image beam 200a. The light beam modulation module 320 is disposed between the projection lens 310 and the light valve 200, and the light beam modulation module 320 is, for example, near the projection lens 310. The light beam modulation module 320 includes a movable light shutter 324 and a fixed light shutter 326. The fixed light shutter 326 is disposed on the optical path of the image beam 200a to shield off a portion of the circumferential light of the image beam 200a. The movable light shutter 324 is suitable for moving into the optical path of the image beam 200a so as to shield off another portion of the circumferential light of the image beam 200a.

In the embodiment, the movable light shutter 324 and the fixed light shutter 326 are, for example, shielding plates. A first opening 326a is included in the fixed light shutter 326 to let the central part of the image beam 200a pass through, and a second opening 324a is included in the movable light shutter 324 to let the central part of the image beam 200a pass through when moving into the optical path of the image beam 200a. The second opening 324a faces the first opening 326a. More specifically, the fixed light shutter 326 can be a half-annular shape, so the first opening 326a is a half-circular opening. The fixed light shutter 326 is used for shielding off the circumferential light of the lower portion of the beam light 200a in FIG. 2B. The movable light shutter 324 can be a plate, and the second opening 324a is a half-circular opening similar to the first opening 326a. The movable light shutter 324 is used for shielding off the circumferential light of the upper portion of the beam light 200a shown in FIG. 2B.

The fixed light shutter 326 of the light beam modulation module 320 of the projection apparatus 400 shields off the dispersed light of the circumference of the image beam 200a, thereby enhancing the image contrast. In addition, a movable apparatus (not shown) may be connected to the movable light shutter 324 to further adjust the area of the image beam 200a passing through the light beam modulation module 320; therefore, the image contrast can be greatly improved. For example, if a high contrast image is required to be projected, the movable light shutter 324 shown in FIG. 2B is moved downward to the location to be in contact with the fixed light shutter 326 (the location of the movable light shutter 324 shown by dash lines in FIG. 2B). At this point, the light beam modulation module 320 shields off the whole circumferential light of the image beam 200a to have the central part of the image beam 200a pass through. As a result, most of the dispersed light at the circumference of the image beam 200a is shielded, and the image on the screen S has higher contrast. Besides, if a high-intensity image is to be projected, the movable light shutter 324 is moved upward to be apart from the optical path of the image beam 200a (the location of the movable light shutter 324 marked by solid lines shown in FIG. 2B), thereby increasing the area for the image beam 200a to pass through. Therefore, since the shielded portion of the image beam 200a is diminished, the brightness of the image projected on the screen S is higher. Of course, the location of the movable light shutter 324 may be divided into several sections to achieve multi-sectional contrast or multi-sectional brightness.

Figure 2C:
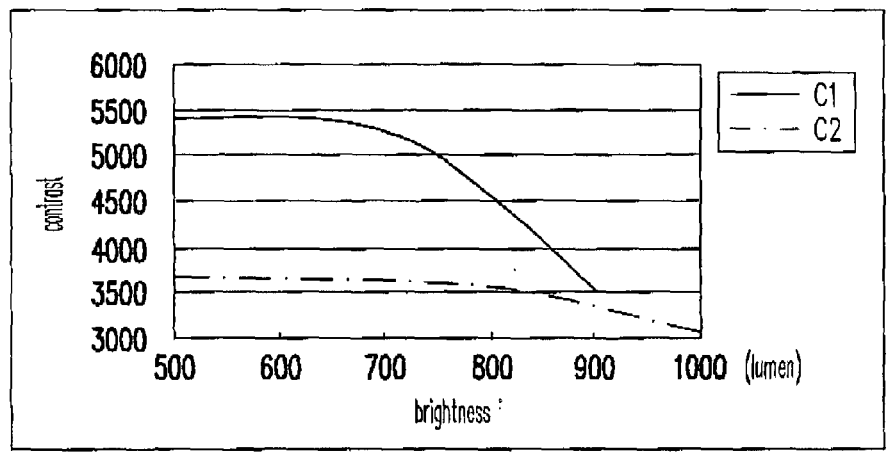
FIG. 2C is a curve diagram illustrating the relationship between the brightness aid the contrast of the images projected by the projection apparatus of FIG. 2A and the conventional projection apparatus.

FIG. 2C is a curve diagram illustrating the relationship between the brightness and the contrast of the images projected by the projection apparatus of FIG. 2A and the conventional projection apparatus. Referring to FIG. 2C, curve C1 in FIG. 2C is the brightness and contrast relationship of the image beam 200a passing through the light beam modulation module 320 of the present embodiment, and curve C2 is the brightness and contrast relationship of the image beam 20a passing through the conventional light shutter 32. It can be seen from FIG. 2C that, compared with the conventional technology, the light beam modulation module 320 of the present embodiment has better effect on improving the image contrast. Therefore, the projection apparatus 400 displays images with better quality because the imaging system 300 of the present embodiment effectively shields off the dispersed light of the circumference of the image beam 200a.

It should be noted that, as the light beam modulation module 320 is disposed between the projection lens 310 and the light valve 200 instead of inside the projection lens 310, thus the fixture structure of the projection lens 310 is simplified and the structure of the projection lens will not be damaged when adjusting the light beam modulation module 320, thus maintaining the structural strength of the projection lens 310. Accordingly, the manufacturing cost of the imaging system 300 is lowered, and the disadvantage of unstable imaging quality in the prior art is resolved. As described, the projection apparatus 400 has cheaper manufacturing cost and better imaging quality.

When the projection apparatus 400 is a non-telecentric system, the aperture of the projection lens 310 is disposed near a lens of tie projection lens 310, and the location of the lens is nearest the light valve 200. Therefore, the external-connected light beam -modulation module 320 of the present embodiment still can effectively shield off the dispersed light of the circumference of the beam light 200a.

Figures 3A, 3B:
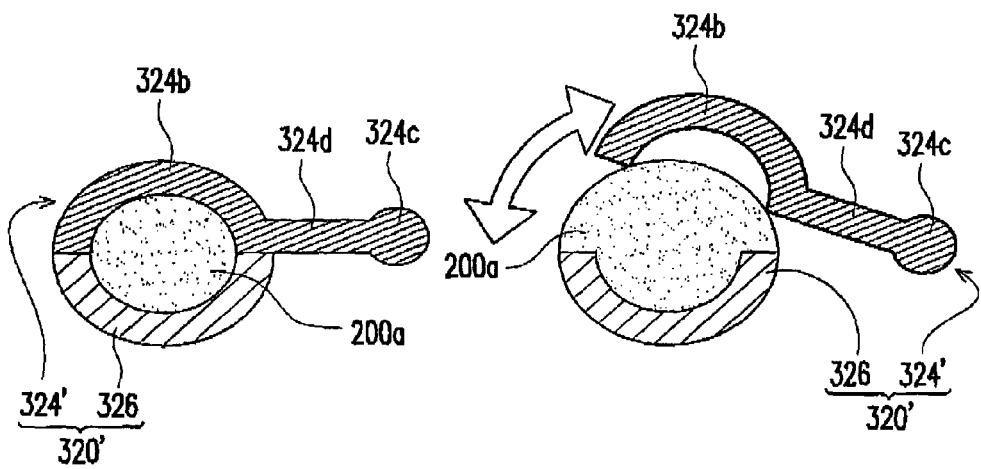
FIG. 3A to FIG. 3B are schematic views of the light beam modulation module moving into and away from the optical path according to another embodiment of the present invention.

In the present invention, the shape of the movable light shutter of the light beam modulation module is not restricted to the shape as shown in FIG. 2B. Another embodiment of the light beam modulation module is described in detail as follows. Referring to FIGS. 3A to 3B, the fixed light shutter 326 of the light beam modulation module 320' is the same as the fixed light shutter 326 of the light bears modulation module 320 shown in FIG. 2B, and the movable light shutter 324' of the light beam modulation module 320' includes a shielding part 324b, a shaft 324c and a connecting part 324d connecting the shielding part 324b with the shaft 324c. The shape of the shielding part 324b can be the same as that of the movable light shutter 324', a half-annular shape, for example. In addition, the movable light shutter 324' moves into or away from the optical path of the image beam 200a by using the shaft 324c as a rotating center.

Figure 4A:
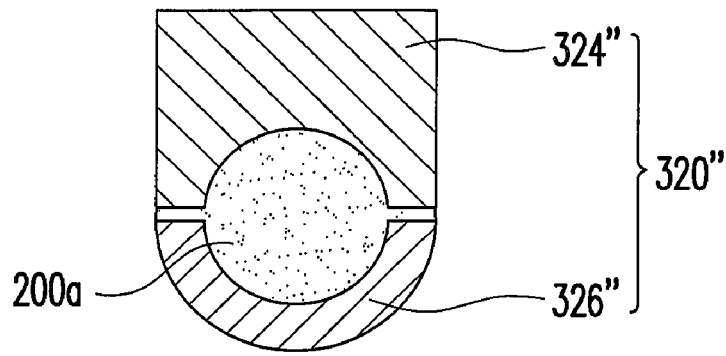
FIG. 4A to FIG. 4C are the schematic views of the light beam modulation module under different conditions according to yet another embodiment of the present invention.
Figure 4B:
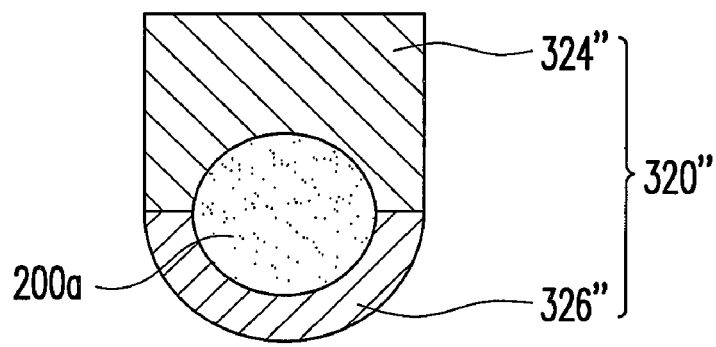
Figure 4C:
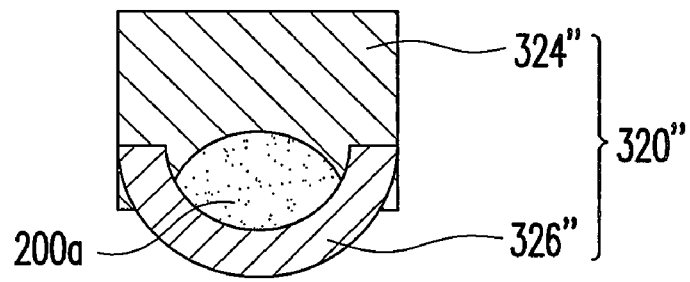

FIG. 4A to FIG. 4C are the schematic views of the tight beam modulation module under different conditions according to yet another embodiment of the present invention. In another embodiment of the present invention, the fixed light shutter 326" is a filter and the movable light shutter 324" is also a filter. Thus, the color temperature can be adjusted to meet the requirement through the filtering function of the light beam modulation module 320". Besides, the location of the movable light shutter 324" can be divided into several sections (as shown from FIG. 4A to FIG. 4C) so that the color temperature of the image can be adjusted as desired. In more detail, if the color temperature of the image projected on the screen S is too high, yellow filters can be used for the movable light shutter 324" and the fixed light shutter 326", so as to partially filter the blue light out of the image beam 200a and lower the color temperature of the image. Similarly, if the color temperature of the image projected on the screen S is too low, cyan filters can be used for the movable light shutter 324" and the fixed light slitter 326", so as to partially filter the red light out of the image beam 200a and increase the color temperature of the image. If the image projected on the screen S is too green, purple filters can be used for the movable light shutter 324" and the fixed light shutter 326", so as to partially filter the green light out of the image beam 200a and solve the problem of the image being too green. Please note that the fixed light shutter 326 and the movable light shutter 324' of FIG. 3A to 3B can be filters. Furthermore, the movable light shutter and the fixed light shutter of the present embodiment can be a combination of a shielding plate and a filter.

In summary, the imaging system and the projection apparatus of the present invention have at least one or more of the following advantages.

1. By adopting a fixed light shutter and a movable light shutter to shield off the dispersed light of the circumference of the image beam, the image contrast is significantly enhanced.

2. Since the light beam modulation module is disposed between the projection lens and the light valve, the structure of die projection lens is simplified and the structural strength thereof is not affected when installing the light beam modulation module.

3. The fixed and movable light shutters of the light beam modulation module can be filters, so the color temperature of the image can be adjusted as desired.

Though the present invention has been disclosed above by the preferred embodiments, they are not intended to limit the present invention. Anybody skilled in the art can make some modifications and variations without departing from the spirit and scope of die present invention. Therefore, the protecting range of die present invention falls in the appended claims.

The foregoing description of the preferred embodiment of the invention has been presented for purposes of illustration and description. It is not intended to be exhaustive or to limit tie invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in die art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiments, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An imaging system, projecting an image beam provided by a light valve unto a screen, the imaging system comprising:
   a projection lens, disposed on an optical path of the image beam to project the image beam unto the screen; and
   a light beam modulation module, disposed between the projection lens and the light valve, the light beam modulation module comprising:
      a fixed light shutter, disposed on the optical path of the image beam and shielding off a portion of the circumferential light of the image beam, wherein the fixed light shutter comprises a first opening; and
      a movable light shutter, moving into the optical path of the image beam so as to shield off another portion of the circumferential light of the image beam, wherein the movable light shutter comprises a second opening facing the first opening, the fixed light shutter is a half-annular shape and the movable light shutter is a plate, and both of the first opening and the second opening are half-circular openings.

2. The imaging system as claimed in claim 1, wherein the fixed light shutter is a shielding plate.

3. The imaging system as claimed in claim 1, wherein the fixed light shutter is a filter.

4. The imaging system as claimed in claim 1, wherein the movable light shutter is a shielding plate.

5. The imaging system as claimed in claim 1, wherein the movable light shutter is a filter.

6. The imaging system as claimed in claim 1, wherein the movable light shutter is connected to a movable apparatus.

7. The imaging system as claimed in claim 1, wherein the movable light shutter includes a shielding part, a shaft and a connecting part connecting the shielding part with the shaft.

8. The imaging system as claimed in claim 1, wherein the light beam modulation module is disposed near the projection lens.

9. A projection apparatus, comprising:
   an illumination system, providing an illumination beam;
   a light valve, disposed on an optical path of the illumination beam to convert the illumination beam into an image beam; and
   an imaging system, disposed on an optical path of the image beam to project the image beam unto a screen, the imaging system comprising:
      a projection lens, disposed on the optical path of the image beam; and
      a light beam modulation module, disposed between the projection lens and the light valve, the light beam modulation module comprising:
         a fixed light shutter, disposed on the optical path of the image beam and shielding off a portion of the circumferential light of the image beam, wherein the fixed light shutter comprises a first opening; and
         a movable light shutter, moving into the optical path of the image beam so as to shield off another portion of the circumferential light of the image beam, wherein the movable light shutter comprises a second opening facing the first opening, the fixed light shutter is a half-annular shape and the movable light shutter is a plate, and the first opening and the second opening are half-circular openings.

10. The projection apparatus as claimed in claim 9, wherein the fixed light shutter is a shielding plate.

11. The projection apparatus as claimed in claim 9, wherein the fixed light shutter is a filter.

12. The projection apparatus as claimed in claim 9, wherein the movable light shutter is a shielding plate.

13. The projection apparatus as claimed in claim 9, wherein the movable light shutter is a filter.

14. The projection apparatus as claimed in claim 9, the movable light shutter is connected to a movable apparatus.

15. The projection apparatus as claimed in claim 9, the movable light shutter includes a shielding part, a shaft and a connecting part connecting the shielding part with the shaft.

16. The projection apparatus as claimed in claim 9, wherein the projection apparatus is a non-telecentric system.

17. The projection apparatus as claimed in claim 9, wherein the light beam modulation module is disposed near the projection lens.

* * * * *